May 3, 1960   D. V. DONATI   2,934,807
REMOVABLE MOLD FOR MAKING BATTER BLOCKS
Filed Aug. 3, 1953   5 Sheets-Sheet 1

Inventor,
Dante V. Donati,
by Heard, Smith, Porter & Chittick
Attys.

May 3, 1960  D. V. DONATI  2,934,807
REMOVABLE MOLD FOR MAKING BATTER BLOCKS
Filed Aug. 3, 1953  5 Sheets-Sheet 2
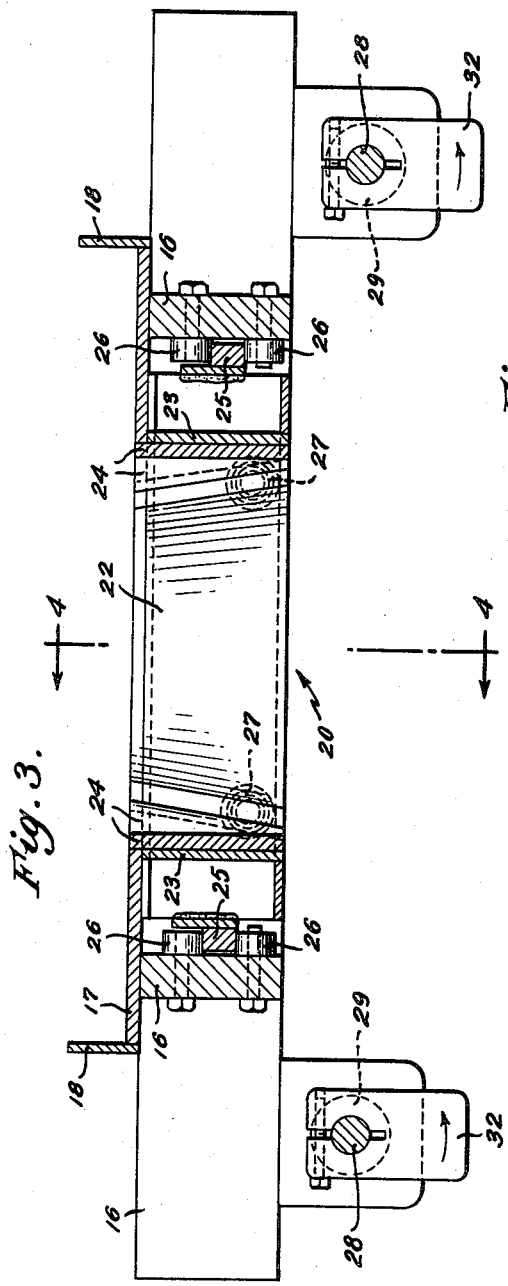
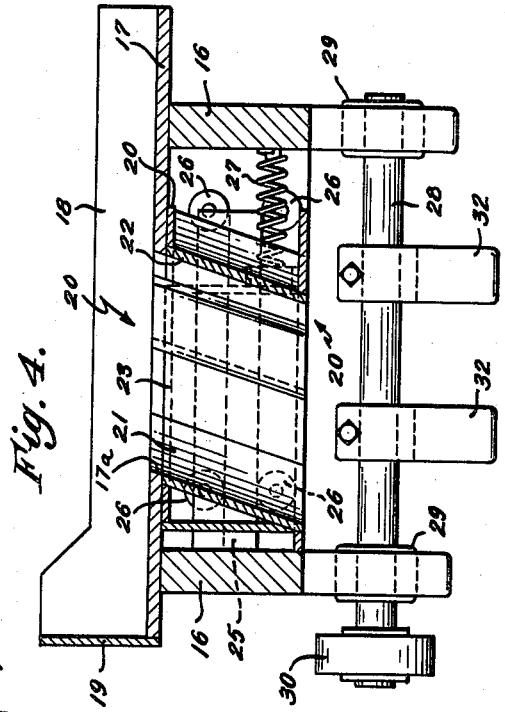
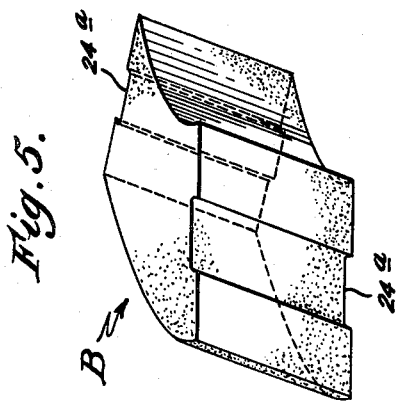
Inventor,
Dante V. Donati,
by Heard, Smith, Porter + Chittick
Attys.

May 3, 1960 D. V. DONATI 2,934,807
REMOVABLE MOLD FOR MAKING BATTER BLOCKS
Filed Aug. 3, 1953 5 Sheets-Sheet 3
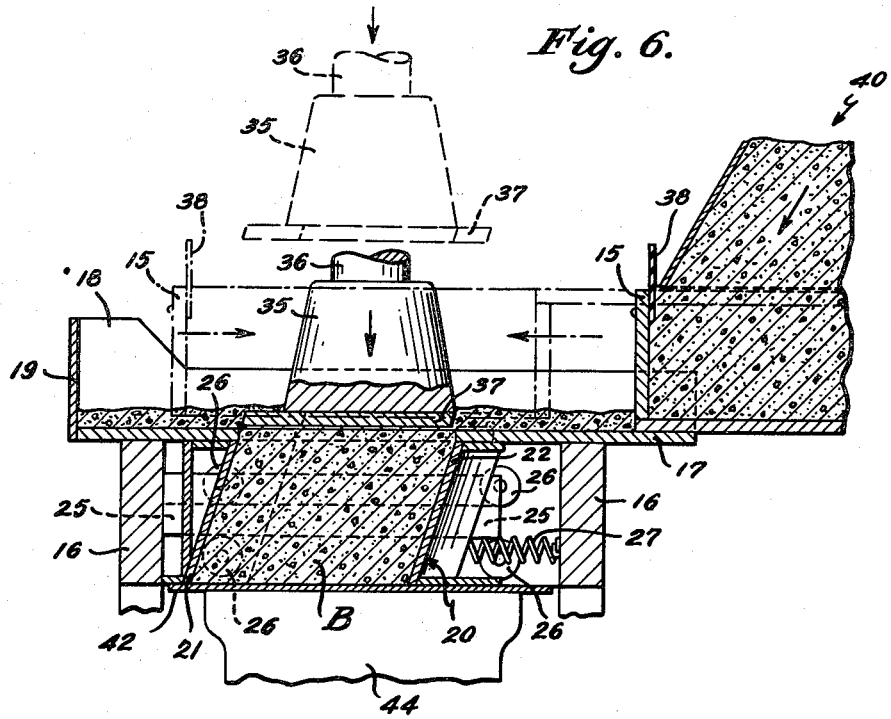
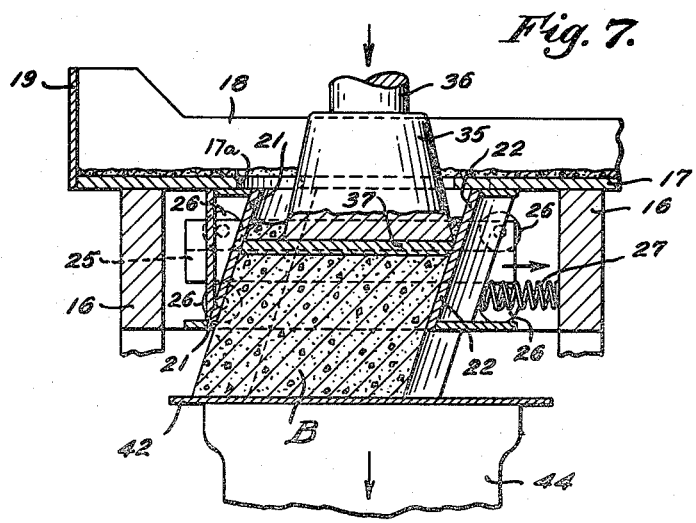
Inventor,
Dante V. Donati,
by Heard, Smith, Porter & Chittick
Attys.

Inventor,
Dante V. Donati,
by Heard, Smith, Porter & Chittick
Attys.

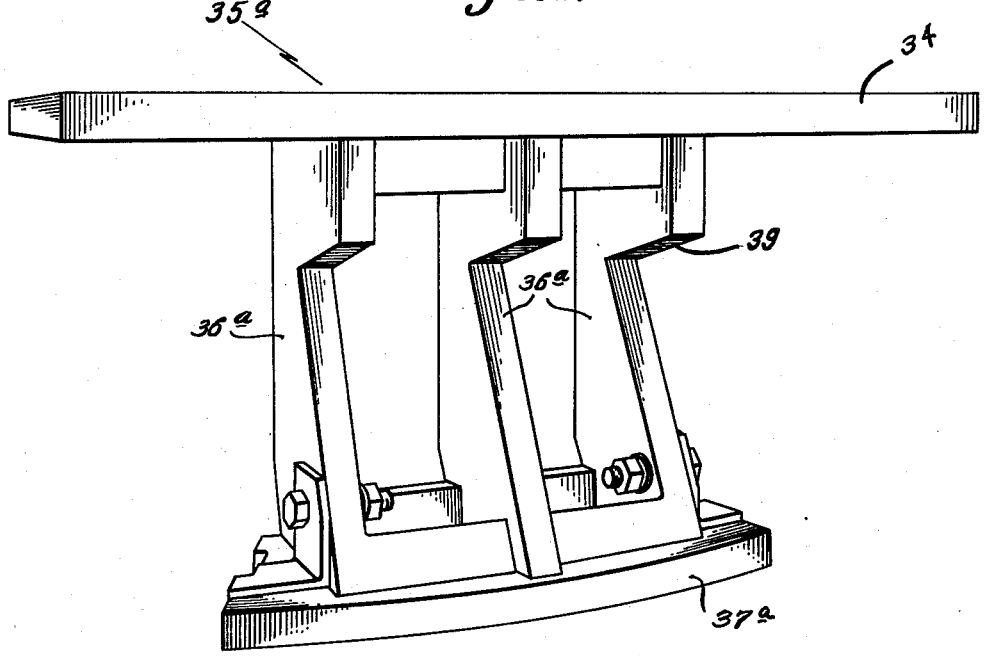

United States Patent Office 2,934,807
Patented May 3, 1960

2,934,807

REMOVABLE MOLD FOR MAKING BATTER BLOCKS

Dante V. Donati, Bedford, N.H., assignor, by direct and mesne assignments, of fifty percent to Batter Block Engineering Corporation, Manchester, N.H., a corporation of New Hampshire, and fifty percent to Anthony Marino, Avon, Mass.

Application August 3, 1953, Serial No. 372,069

14 Claims. (Cl. 25—41)

This invention relates to a machine for making concrete blocks, and particularly to an interchangeable mold for making batter blocks for use in a standard concrete block making machine.

Concrete block making machines are in common use for making rectangularly-shaped concrete blocks. These blocks having vertical sides are readily made in standard machines using a vertically movable pressure head. In such machine a liquid mixture of cement and sand is delivered from a hopper into a mold having the inside dimension of the finished cement block desired to be cast, the mold is vibrated to settle the cement and fill in voids, the surplus cement mixture is scraped off the top and a pressure head descending vertically then pushes the block out through the bottom of the mold onto a pallet or pan, where it is carried off to the kilns or drying ovens.

It has heretofore been regarded as impossible to make batter blocks on a standard concrete block machine. Catch basins and manholes for highway use and cesspools are generally cylindrical in shape and are also commonly made of cement blocks. The vertical cylindrical sides of the catch basin, manhole or similar structure are commonly made of cement blocks having arcuately shaped vertical sides on both the outside and the inside of the block. These blocks are commonly called "barrel blocks." In a common catch basin the vertical cylindrical sides are formed by several courses of barrel blocks and are then topped by several courses of so-called batter blocks, the sides of which slope inwardly and upwardly to form a rounded top for the catch basin or other structure. The batter blocks have sloping sides on both the outside and inside, sloping at an angle of approximately 30° to 40°, as may be desired. The barrel blocks having vertical sides are commonly made in standard concrete block machines, just as rectangular concrete blocks are made, the only difference being the different shape of the mold. But batter blocks having sloping sides could not heretofore be made on a standard concrete block machine, because the vertically descending pressure head could not push the block out of a mold having sloping sides. Accordingly concerete batter blocks have previously been made by hand or in a machine specifically designed for making concrete batter blocks alone. The price of batter blocks relative to barrel blocks has, therefore, been considerably higher.

I have now been able, however, to devise a mold to be used in a standard concrete block making machine for making batter blocks with their sloping sides. This permits large scale manufacture of batter blocks and eliminates the cost of a separate machine for making them, and greatly reduces their cost of manufacture over the hand method. By the hand method heretofore, two men, one shoveling the concrete mixture and the other tamping it down into the mold, were able to make about 100 batter blocks in an 8 hour day, or about 12 per hour. With my mold, however, two men in a standard concrete block making machine are now able to make 2400 batter blocks in an 8 hour day, or 300 blocks per hour—an increase of 24 fold. The cost of making batter blocks has thus been greatly reduced—and by the same token the cost of making concrete block catch basins has been reduced from about $225 each to about $60 each. With my interchangeable mold for making batter blocks, the same standard machine can be used interchangeably for making standard rectangular concrete blocks, batter blocks and barrel blocks as desired, by merely changing the mold, and without the necessity of buying a separate machine for making batter blocks. An entire new field of manufacturing concrete blocks for highway catch basins, manholes, cesspools and the like has thus been opened up for the manufacturer of concrete building blocks, who has a standard block making machine, without additional cost for equipment other than an interchangeable mold and pressure head. The machine in which my mold is designed to be used is the standard "Vibrapac" machine made by The Besser Manufacturing Co. of Alpena, Michigan, but it will be understood that any mold can be used on other concrete block making machines without material modification.

Briefly my device comprises, in combination with a standard concrete block making machine having a pressure head or mold box mounted for reciprocal vertical movement, a removable frame carrying a mold having slanting sides slidable therein, means for filling the mold with a concrete mixture, the mold sliding backwardly in the frame as the pressure head descends to strip the block from the mold onto a pallet. As the pressure head ascends for its next downward stroke, the mold is returned to its original position in the frame, ready for a second charge of cement mixture. The process of manufacture comprises in combination with a standard concrete block making machine having a pressure head mounted for reciprocal vertical movmeent, a removable frame carrying a mold having slanting sides and slidable in said frame, the steps of filling the mold with a concrete mixture, stripping the block from the mold as the pressure head descends moving the mold backwardly in the frame, and returning the mold to its original position in the frame on the ascension of the pressure head.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the express language of the claims and the requirements of the prior art.

Further advantages of my device will appear in the following specification and accompanying drawings, in which Fig. 1 is a plan view of the removable frame with mold therein;

Fig. 3 is a vertical section on line 3—3 of Fig. 1;

Fig. 4 is a vertical section on line 4—4 of Fig. 3;

Fig. 5 is a view of the finished batter block;

Fig. 6 is a vertical section through the mold showing the operation of the pressure head;

Fig. 7 is a view similar to Fig. 6 showing the pressure head during the act of stripping the block from the mold;

Fig. 11 is a perspective view of a modified form of pressure head.

Figure 1:
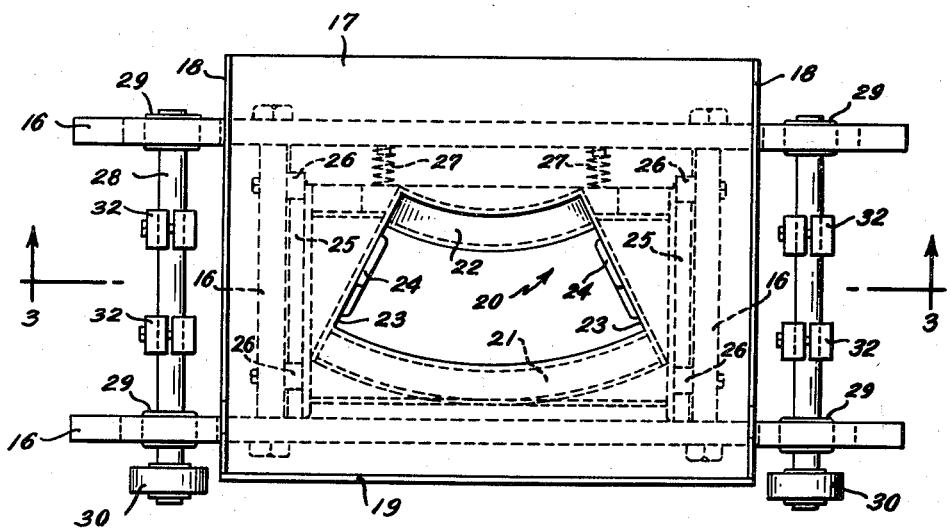
Figure 2:
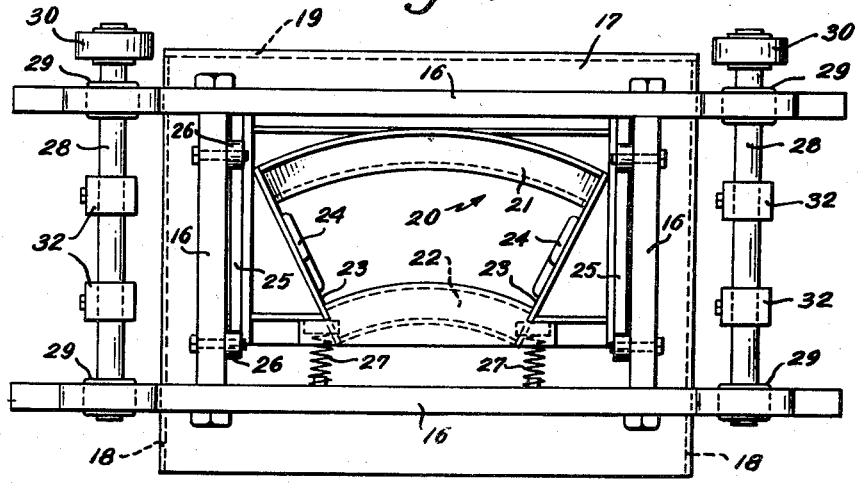
Fig. 2 is a bottom view of the same frame and mold as shown in Fig. 1.

In the drawings there is shown a portion of a standard concrete block making machine as commonly used for making the rectangular building block or arcuate barrel block. As such machines are well known in the art the machine need not be described in detail. It will be understood that my mold and frame can be adapted for installation in all standard types of concrete block making machines. As stated above my mold is shown as used in a standard "Vibrapac" machine as made by the Besser Manufacturing Company of Alpena, Michigan. But it will be understood that my device is capable of being modified for use with all other standard concrete block making machines having vertically operating pressure heads. It will be understood that such machines will include as essentials a frame, a concrete hopper into which the sand and cement mix is delivered, a movable feed box 15 to which the cement mix is delivered from the hopper, a removable frame 16 carrying the slidable mold 20 therein. A pressure head 35 on ram 36 forms an integral part of the concrete block making machine, and will be understood to operate in timed sequence with other parts of the block making machine.

The mold frame 16 for holding the mold 20 is a standard removable frame as used in such machines for holding molds of various size, and includes a top tray 17, sides 18 and front side 19. An opening 17a provided in the middle of the top tray 17 beneath which the mold 20 is slidably mounted, defines the shape of the mold in horizontal plane. The mold 20, of course, is formed in the shape and size of the concrete block to be cast therein, is open at the top and bottom, and comprises front side 21, rear side 22 and lateral sides 23, enclosing the block cavity. Front and rear sides 21 and 22 are inclined downwardly and forwardly from top to bottom at an angle of 30° to 40° as desired, and the sides 23 are vertical. The sides 23 carry ridges 24 to form corresponding grooves 24a in the sides of the batter block B. The mold 20 is slidably supported within frame 16. This is accomplished by means of a pair of tracks 25 which are fixedly attached to the two lateral sides 23 of mold 20, and by means of rollers 26 carried by frame 16. Tracks 25 extend longitudinally of the machine, and their top and bottom surfaces are engaged by rollers 26 (Fig. 3). Accordingly, mold 20 is free to slide relative to frame 16 and the top plate 17 longitudinally of the machine along a straight line path determined by tracks 25 and rollers 26. Coil springs 27, located on the rear side of mold 20 and acting between mold 20 and frame 16, function to return the mold to its starting position, after being moved rearwardly by the pressure head 35, as it descends through the mold cavity in stripping the batter block B from the mold, as explained below. A vibrator assembly is attached to the sides of the frame 16 and comprises longitudinal shafts 28 mounted in suitable journals 29 extending from the frame 16, the shafts 28 being rotated by belt-driven pulleys 30 driven from an electric motor. Fixed on the shafts 28 are eccentrically mounted weights 32, and when the shafts 28 are rapidly rotated the weights 32 cause the mold frame 16 to vibrate rapidly in a lateral direction and thus to settle the cement mix in the mold 20, and fill any voids which may have been left in the mold.

Figure 8:
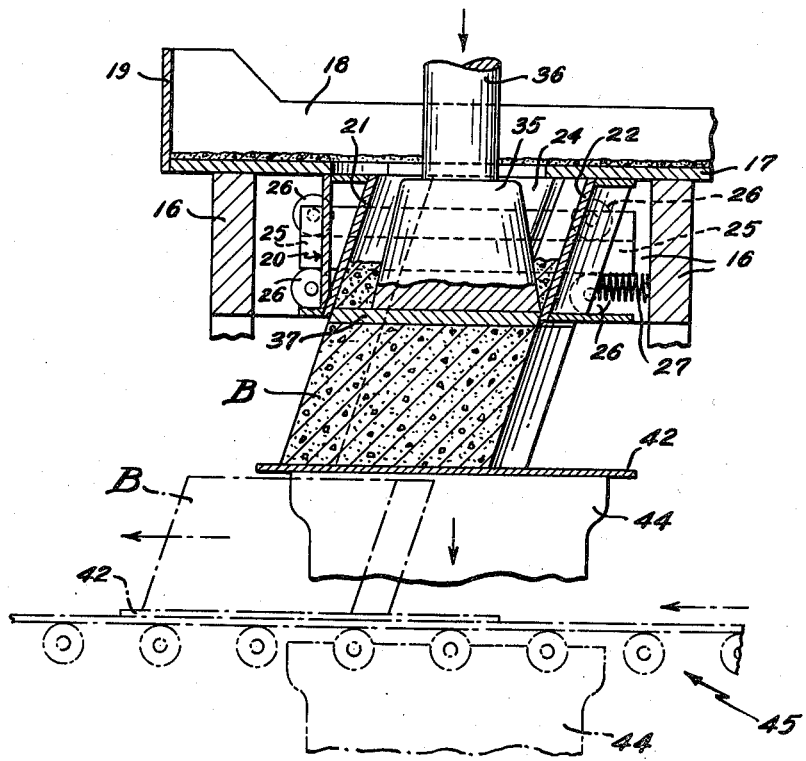
Fig. 8 is a similar view showing the pressure head after completing the act of stripping the block from the mold.

In the operation of the machine it will be understood that the feed box 15 reciprocates forwardly and rearwardly in a horizontal plane (Fig. 6). In its rearward position it is kept constantly filled with concrete mix from the aggregate hopper generally indicated at 40 (Fig. 6) and on its forward movement in the cycle of the machine it carries its charge of concrete mix onto the top plate 17 of the mold frame 16 and empties it into the cavity of the mold. On its return stroke it cleans off the top of the mold and in addition scrapes the under side of the pressure head plate 37, cleaning it of cement by means of a flexible wiper 38. During this operation the mold 20 is being vibrated rapidly to shake down the cement in the mold. Then in the time cycle of the machine the pressure head 35 descends. The shoe or plate 37 of the pressure head 35 has the same shape as the opening of the block cavity in the mold 20 and as it descends compresses the cement in the mold. A movable pallet 42 is provided under the mold 20, supported on the column 44, which descends in timed relation synchronously with the pressure head 35. Thus as the pressure head 35 descends supports 44 and pallet 42 descend similarly and the pressure plate 37 pushes and strips the cement block B from its mold 20 onto the pallet 42 (Figs. 6, 7 and 8). As the pressure head 35 descends vertically, the rear edge of the pressure plate 37 engages the rear sloping surface 22 of the mold 20 and cams the mold rearwardly against the forces of coil springs 27. When the block B has been stripped entirely clear of its mold 20 the pallet 42 carrying the batter block B is lowered to the conveyor belt generally indicated at 45 to deliver the blocks to the front of the machine where the operator lifts them off and places them on a suitable truck for conveying to the kiln drying ovens. As the pressure head 35 rises on its return stroke the front side of pressure plate 37 sliding against the forward wall 21 of the mold 20 cams it forwardly and with the aid of coil spring 27 returns mold 20 to its proper position in the frame 16.

Figure 9:
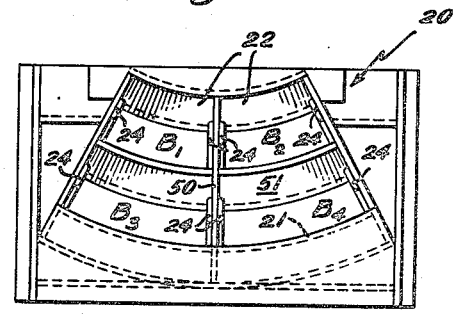
Fig. 9 is a plan view of a modified form of mold for making four batter blocks at once.

In Fig. 9 I have shown a compartmented mold 20 for making two pairs of batter blocks of two different sizes designated B1, B2, B3 and B4. This is done by providing transverse and longitudinal dividing plates 50 to 51 respectively. It will be understood that the pressure head 35 will be similarly shaped to fit the respective mold cavities for the blocks B1, B2, B3 and B4. Otherwise the operation of the machine will be the same as in Figs. 1 to 8 inclusive.

Figure 10:
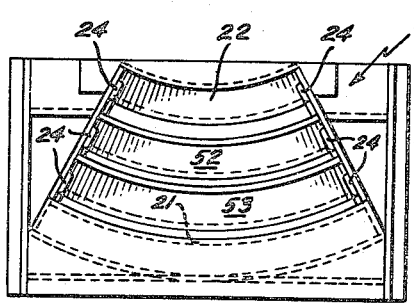
Fig. 10 is another plan view of a modified form of mold for making three batter blocks at once.

In Fig. 10 I have shown a similar compartmented mold 20 for making three batter blocks of different sizes. This is done by providing two lateral dividing plates 52 and 53. Again with the pressure head 35 equipped with pressure plates 37 to fit the three mold compartments, the molds 20 and the operation is the same as with the form of the mold and machine shown in Figs. 1 to 8 inclusive. With the compartmented molds as shown in Figs. 9 and 10 it will be plain that several batter blocks of varying sizes or of the same size can be made at the same time. The range in sizes are preferably from 3 to 8 inches high and from 8 to 26 inches long and with 8 inches in thickness.

While the mold 20 in Figs. 1 to 8 inclusive is shown with its front and rear sides 21 and 22 arranged transversely of the machine, it will be understood that the mold 20 may be turned around so that the front and rear sides 21 and 22 extend longitudinally of the machine, and if desirable two such molds may be placed side by side. In that event of course the tracks 25 on which the mold 20 slides would be arranged transversely of the machine so that the mold will slide transversely as the pressure head 35 descends into the mold. Likewise while the molds as shown herein are caused to slide on the tracks 25 by the camming action of the pressure head plate 37 against the rear plate 22 of the mold, it will be understood that this rearward movement of the mold 20 (as shown in Figs. 1 to 8 inclusive) can be imparted to the mold, independent of the camming action of the pressure head plate 37, by independent mechanism, such as a rack and pinion (not shown) acting in timed relation with the descent of the pressure head 35, without departing from my invention.

In Fig. 11 I have shown a modified form of pressure head 35a comprising stripper head 34 which is mounted on the machine in any suitable manner as by bolts (not shown), plungers 36a attached to stripper head 34, and a stripper shoe or plate 37a secured to plungers 36a. The plungers 36a are notched as at 39 to provide clearance as the mold recedes during the descent of the pressure head 35a.

As used herein, the terms "pressure head" and "stripper head" are substantially synonymous, and refer to the mechanism mounted for vertical reciprocal movement which includes the plate (referred to as "pressure plate 37" in Fig. 1 or "stripper shoe or plate 37a" in Fig. 11), for stripping blocks from the mold.

I claim:

1. A block making machine comprising a pressure plate, means mounting said pressure plate for reciprocal vertical movement, a removable frame horizontally positioned below said pressure plate mounting means in alinement with said pressure plate, an open mold for making batter blocks having front and rear sides slanting downwardly in the same direction, means mounting said mold for reciprocal horizontal movement within said frame first in a direction opposite to the direction of slant of said front and rear sides and then in a direction the same as the direction of slant of said front and rear sides, whereby said pressure plate is permitted to penetrate said mold from the top substantially to the bottom thereof as said mold moves in said opposite direction and to be vertically withdrawn from said mold as said mold moves in said same direction.

2. A block making machine comprising a pressure plate mounted for reciprocal vertical movement, a mold open at the top and bottom and comprising two opposed sides slanting downwardly and forwardly of said pressure plate, means mounting said mold for reciprocal horizontal movement forwardly and rearwardly of said pressure plate between first and second points of travel respectively, said mold being vertically positioned by said mounting means to permit penetration by said pressure plate as said pressure plate moves downwardly, said mold when positioned at said first point of travel having its open top in registration with said pressure plate and when at said second point of travel having its open bottom in registration with said pressure plate, said mold moving rearwardly as said pressure plate enters its top and continues to the bottom thereof and moving forwardly as said pressure plate is withdrawn from the bottom of said mold.

3. An apparatus for making concrete blocks comprising in combination a horizontal frame, an open mold positioned within said frame, means mounting said mold for horizontal reciprocal movement within said frame, said mold comprising two opposite sides which are slanted downwardly in the same direction and extend transversely of the path of movement of said mold, the top end of said frame having an opening defined by the sides thereof that is partially offset from a similar opening defined by said sides at the bottom thereof, a pressure head mounted for reciprocal vertical movement above said frame, said pressure head having a downward stroke of sufficient length to penetrate said mold, said mold being cammed by said pressure head in one direction along its path of movement as said pressure head penetrates said mold, whereby the bottom opening of said mold is brought into vertical registration with said pressure head.

4. The apparatus of claim 3 including means normally urging said mold in one direction for maintaining the open top of said mold in vertical alinement with said pressure head when said pressure head is in raised position.

5. In a concrete block-making machine of the type having a pressure head mounted for reciprocal vertical movement, a mold disposed horizontally in the path of travel of said pressure head, said mold having a mold cavity open at the top and bottom and normally being located so that the open top of said cavity is positioned to receive said pressure head when it moves downward, said cavity conforming in shape to a batter block and being defined by two planar vertically-extending walls disposed in divergent relation to each other and two parallel spaced curved walls extending between said two planar walls, said two curved walls being inclined in the same direction with one curved wall having a larger radius of curvature than the other curved wall, means slidably supporting said mold for reciprocal horizontal movement only along a path parallel to a vertical plane passing through the center line of said cavity, means for shifting said mold along said path with a direction of movement from said one curved wall to said other curved wall as said pressure head moves downward in said cavity, and means for shifting said mold along said path with a direction of movement from said other curved wall to said one curved wall as said pressure head moves upward out of said cavity.

6. In a concrete block making machine a horizontal mold, said mold having a cavity open at its top and bottom ends defined by first and second vertically extending side walls disposed in spaced converging relation to each other and third and fourth oppositely disposed walls extending between said first and second side walls, said third and fourth walls both being curved, said third and fourth walls also being slanted in the same direction so that the open top end of the cavity is offset slightly with respect to the open bottom end of the cavity, a pressure head mounted above said mold for vertical reciprocal movement, said pressure head including a flat horizontal plate fixed to its bottom end, said pressure head having a downward stroke of sufficient length to cause said plate to penetrate into said cavity to strip a block from said mold, said plate conforming in shape to the cross section of said mold cavity and having two of its opposite edges beveled and curved to correspond to the slant and curvature of said third and fourth walls, said plate being only slightly smaller than said cavity so as to be movable into said cavity to strip a concrete block therefrom, said mold normally being positioned with the top end of the cavity in alinement with said plate, and means slidably supporting said mold for reciprocal horizontal movement along a path normal to said third and fourth walls at their vertical center lines, whereby said mold is movable horizontally to accommodate said plate as it descends and ascends in said cavity.

7. In a concrete block-making machine of the type having a pressure head mounted for vertical reciprocal movement, said pressure head including a horizontal stripper plate for stripping blocks from a mold, a mold located in the path of said stripper plate having a mold cavity open at the top and bottom defined by two opposed side walls, a front wall and a rear wall, the bottom edges of said side, front and rear walls being in a common horizontal plane, said front and rear walls both slanting downwardly and forwardly with the top end of said mold cavity being offset partially from the bottom end of said cavity, and means mounting said mold for straight line reciprocal motion forwardly and rearwardly in a fixed horizontal plane between a first position wherein the top end of said cavity is in line with said plate and a second position wherein the bottom end of said cavity is in line with said plate.

8. The process of making batter blocks in a batter block mold having a mold cavity open at the top and bottom and defined by a front wall and a rear wall both slanting downwardly and forwadrly and a pair of opposed side walls both extending vertically, comprising the steps of filling the mold cavity with a concrete mixture, lowering a stripper plate into the top end of said mold cavity to compress said concrete mixture into a solid block, moving said stripper plate further down into said cavity to strip the block therefrom, simultaneously shifting the mold horizontally in a rearward direction to permit said stripper plate to penetrate said mold cavity to strip the block therefrom, raising said stripper plate to withdraw it from said mold cavity, and simultaneously shifting said mold horizontally in a forward direction back to its original position to permit said stripper plate to be withdrawn from said mold cavity.

9. The process of making batter blocks in a batter block mold having a mold cavity open at the top and bottom defined by a front wall and a rear wall both slanting downwardly and forwardly and a pair of opposed side walls, comprising the steps of supporting a pallet beneath said mold to close the bottom of said cavity, filling said mold cavity with a concrete mixture, lowering a vertically reciprocal stripper plate into contact with the concrete mixture in said cavity to compress said mixture into a solid block, simultaneously (1) lowering said pallet relative to said mold, (2) lowering said stripper plate further into said cavity to strip said block therefrom and (3) shifting said mold horizontally in a rearward direction as said stripper plate descends whereby to permit said stripper plate to penetrate said cavity to strip the said block therefrom, raising said stripper plate after said block has been stripped, and shifting said mold horizontally in a forward direction as said stripper plate is raised whereby to permit said stripper plate to be withdrawn fully from said cavity.

10. In a concrete block-making machine, a mold for making batter blocks, said mold having two oppositely disposed curved walls and two oppositely disposed vertically extending planar walls fixedly arranged to define a cavity open at the top and bottom conforming in shape to a batter block, a vertically reciprocal pressure head located above said mold comprising a stripper plate for stripping blocks from said mold, said plate conforming in shape to the horizontal cross-section of said cavity, and means supporting said mold for reciprocal straight line horizontal movement along a path normal to said curved walls at their vertical center line whereby to accommodate said plate in said cavity as it descends and ascends to strip a block from said mold.

11. In a concrete block-making machine a horizontal mold, said mold having a cavity open at its top and bottom ends defined by first and second vertically extending side walls disposed in spaced converging relation to each other and third and fourth oppositely disposed walls extending between said first and second walls, said third and fourth walls both being curved, said third and fourth walls also being slanted in the same direction, whereby the top end of the cavity is offset with respect to the open bottom end of the cavity, a pressure head mounted above said mold for reciprocal vertical movement, said pressure head having on its bottom end a flat horizontal plate and having a downward stroke of sufficient length to penetrate said cavity with said plate, whereby to strip a block from said mold, said plate conforming in shape to the cross section of said mold cavity, said plate being slightly smaller than said cavity so as to be movable into said cavity, said plate and the top end of said cavity being in alinement with each other when said plate is above said mold, and means for providing relative reciprocal horizontal movement between said mold and said plate along a path normal to said third and fourth walls at their vertical center lines as said pressure head descends and ascends, whereby to facilitate penetration of said cavity by said plate as said pressure head descends and removal of said plate from said cavity as said pressure plate ascends.

12. In a concrete block-making machine a horizontal mold, said mold having a cavity open at its top and bottom ends defined by first and second vertically extending walls disposed in spaced converging relation to each other and thirid and fourth oppositely disposed curved walls extending between said first and second side walls, said thirid and fourth walls slanting in the same direction so that the open top end of said cavity is offset with respect to the open bottom end of the cavity, a stripper head mounted above said mold for reciprocal vertical movement, said stripper head comprising a plurality of depending plungers and a flat stripper plate attached to the bottom end of said plungers for stripping blocks from said mold upon downward movement of said stripper head, said stripper plate conforming in shape to the cross section of said mold cavity, said depending plungers having edge surfaces slanted in the same direction as one of said tihrd and fourth walls of said cavity so as to provide clearance between said plungers and said one wall as said stripper plate moves downward and upward in said cavity, and means providing relative reciprocal movement between said stripper plate and said mold in a horizontal plane along a path normal to said third and fourth walls at their vertical center lines as said stripper plate moves downward and upward in said cavity.

13. The process of making batter blocks in a batter block mold having a mold cavity open at its top and bottom ends defined by a curved front wall and a curved rear wall both slanting downwardly and forwardly, and a pair of opposed side walls with said top end of the cavity offset partially from said bottom end, comprising the steps of supporting a pallet beneath said mold to close said bottom end, filling the cavity with a concrete mixture, lowering a stripping plate into the top end of said cavity to compress said mixture into a solid block, simultaneously (1) lowering said pallet relative to said mold, (2) lowering said stripping plate further into said cavity to strip said block therefrom, and (3) providing relative horizontal movement between said stripping plate and said mold in a first direction to premit said plate to move to the bottom of said cavity to fully strip the block therefrom and deposit it on said pallet, and thereafter simultaneously (1) raising said plate to withdraw it from said cavity and (2) providing relative movement between said plate and said mold in a second opposite direction to permit full withdrawal of said plate from said cavity.

14. Apparatus adapted to be employed in a concrete block-making machine whereby said machine can be used to produce batter blocks, said apparatus comprising an open rectangular frame having a front side, a rear side, and two opposed parallel lateral sides, a mold positioned within said rectangular frame, said mold having a mold cavity open at the top and bottom defined by two planar vertically extending lateral side walls disposed in divergent relation to each other, and spaced correspondingly curved front and rear walls extending between said two planar lateral side walls, said front and rear curved walls both being inclined in the same direction with the top end of said cavity offset partially from the bottom end of said cavity, first and second means connected to said frame and mold respectively slidably suppporting said entire mold for relative reciprocal motion within the plane of said frame only along a straight line path of limited length extending parallel to said lateral sides and normal to said front and rear sides of said frame, and spring means connected between said mold and frame for opposing rearward movement of said mold within said frame and for automatically positioning said mold at the forward end of said straight line path.

References Cited in the file of this patent
UNITED STATES PATENTS

| | | |
|---|---|---|
| 708,256 | Reif | Sept. 2, 1902 |
| 717,707 | McIntosh | June 6, 1903 |
| 770,251 | Arnsen | Sept. 20, 1904 |
| 784,154 | Gutteridge | Mar. 7, 1905 |
| 910,724 | Reif | Jan. 26, 1909 |
| 1,542,191 | Van Hullen | June 16, 1925 |
| 1,776,888 | Clark | Sept. 30, 1930 |
| 1,921,003 | Romie | Aug. 8, 1933 |
| 2,015,980 | Walker | Oct. 1, 1935 |
| 1,921,003 | Romie | Aug. 8, 1933 |
| 2,305,112 | Scott | Dec. 15, 1942 |
| 2,532,049 | Wittke | Nov. 28, 1950 |
| 2,593,409 | Brown | Apr. 22, 1952 |